J. LEISINGER.
TESTING PLUG.
APPLICATION FILED OCT. 26, 1909.
987,145.
Patented Mar. 21, 1911.
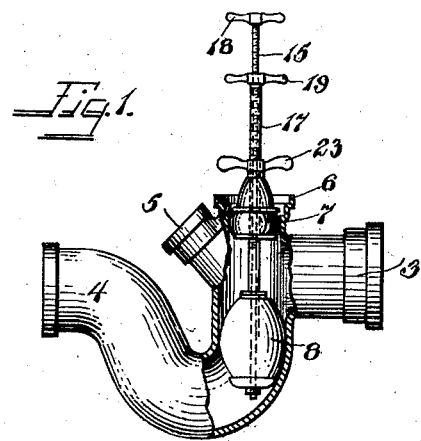
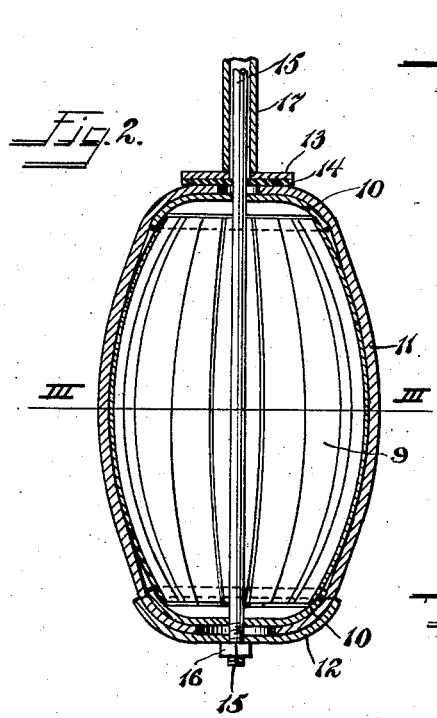
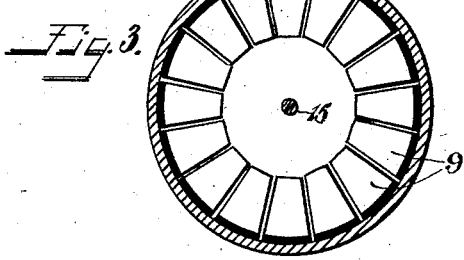
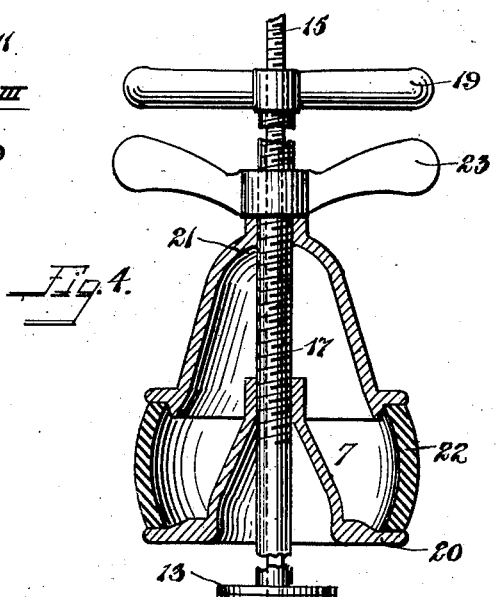
WITNESSES
INVENTOR

UNITED STATES PATENT OFFICE.

JACOB LEISINGER, OF PITTSBURG, PENNSYLVANIA, ASSIGNOR OF ONE-HALF TO CHARLES H. AUSTIN, OF PITTSBURG, PENNSYLVANIA.

TESTING-PLUG.

987,145.

Specification of Letters Patent. Patented Mar. 21, 1911.

Application filed October 26, 1909. Serial No. 524,735.

*To all whom it may concern:*

Be it known that I, JACOB LEISINGER, a citizen of the United States, residing at Pittsburg, in the county of Allegheny and State of Pennsylvania, have invented certain new and useful Improvements in Testing-Plugs, of which the following is a specification.

My invention has relation to the devices for testing waste and sewer systems, commonly called testing plugs. It has for its primary objects: the provision of an improved positively actuated testing plug; the provision of an improved arrangement of testing plugs and operating means therefor; and the provision of a cheap but effective testing device for waste systems. These and such other objects as may hereinafter appear I attain by means of a construction illustrated in preferred form in the accompanying drawings, which form a part of this specification. Of the drawings Figure 1 is a view partly in section showing the application of my testing plug device, Figure 2 is a longitudinal section through one of the plugs of Figure 1, Figure 3 is a section on the line III—III of Figure 2, and Figure 4 is a section of the other plug shown in Figure 1.

Referring to the drawings, (particularly Figure 1 thereof), it will be seen that my invention is designed for use in connection with the usual form of trap provided for testing purposes for waste or sewer systems at an accessible spot close to or within the building, containing the system. This trap has an inlet 3 for the waste from the building; an outlet or discharge end 4 to the pool or sewer; a vent 5 for the escape of gases, the pipe (not shown) leading therefrom extending to substantially the top of the building in the usual manner; and a testing cleaning opening 6 ordinarily closed by a removable plug. When the system is to be tested for leaks or other faults, this plug is removed from the opening 6 and a testing device inserted. My testing device consists of two expansible plugs 7 and 8, the latter of which is designed to close the discharge end passage of the trap and the former the testing opening 6. The plug 8 comprises a flexible cylinder or body portion which is made of a plurality of thin metal strips 9 closely adjacent, and secured at either end to cap plates 10—10. A shell 11 preferably of rubber or other compressible elastic substance substantially incloses the body portion of the plug, the one end thereof being closed by the cap plate 12 and the other by the ring or washer 13 and packing 14. The plug is expanded by drawing the opposite ends toward one another, thereby forcing or bulging out the strips 9 constituting the sides of the plug. This is accomplished by means of a rod 15 extending through the plug and secured at one end by the nut 16 and telescoping in a casing 17, which bears against the washer 13 (see Fig. 2). The rod 15 is screw threaded for a considerable distance and is provided with a handle 18 for turning it and with a screw threaded handle 19 bearing against the upper end of the casing 17. By holding the screw threaded handle 19 stationary and turning the rod 15 by the handle 18, the rod 15 will move upwardly through the casing 17 drawing with it the lower end of the plug 8 toward the upper end, the casing 17 forming a positive spacing member between the upper end of the plug 8 and the handle 19 mounted on the rod 15.

A portion of the casing 17 is screw threaded and carries the plug 7 which consists of a stationary member 20 and a movable member 21 acting on an interposed expansible ring 22 preferably made of rubber or other suitable material or composition. The movable member 21 is loosely mounted on the casing 17 and is operated to compress and thereby to expand the ring 22 by means of a wing nut 23. The stationary member 20 is screw threaded to the casing 17 so that the position of the plug 7 may be adjusted with respect to the plug 8. The plug 8 is first secured or anchored by expanding it, then the plug 7 is adjusted toward or from the plug 8 to accommodate the whole device to the varying sizes of traps, and after adjustment expanded as above set forth. Should the testing or clean out opening 6 be of a tapered form a tapered plug is substituted for the plug 7. When the plug 8 is expanded and anchored all leakage through it is prevented by the pressure of the cap plate 12, washer 13 and packing 14 on the end of the shell 11, which pressure is caused by the spring resistance of the strips 9 to the compressive action of the rod 15 and casing 17. It is obvious that the plug 8 may be altered in a variety of ways without departing from the spirit of my invention.

Because of its peculiar construction and its shell or covering 11 the plug 8 will fill or fit any irregularities in the passages of the trap. Another advantage of my construction is that the different sizes of the clean out opening and main passage of the trap will not interfere with the ready insertion and removal of the plug 8, nor with the successful operation of the device. Other advantages will readily present themselves to those familiar with the art.

Having thus described my invention and illustrated its use, what I claim as new and desire to secure by Letters Patent is the following:—

1. A testing plug comprising a substantially continuous cylindrical body portion consisting of a plurality of thin metal strips placed edge to edge, a relatively thick rubber shell tightly embracing the body portion, and means for drawing the ends of the body portion toward one another to cause the central portion thereof to increase in diameter.

2. A testing plug comprising a cylindrical body portion consisting of a pair of circular metal end plates, a plurality of thin metal strips placed edge to edge and secured at their ends to the end plates, a relatively thick rubber shell tightly embracing the end plates and the strips, and means extending through the body portion and secured to one of the said plates for forcing the end plates toward each other.

3. A testing plug comprising a cylindrical body portion consisting of a pair of circular metal end plates, a plurality of thin metal strips having their greatest width at their center and tapering to their ends placed edge to edge and secured at their ends to the end plates, a relatively thick rubber shell tightly embracing the end plates and the strips, and means extending through the body portion and secured to one of the said plates for forcing the end plates toward each other.

4. In combination in a testing device, an expansible lower plug member, a rod extending therethrough threaded at its upper end and secured at its lower end to the lower end of the plug, an exteriorly threaded sleeve mounted on the rod and bearing upon the upper end of the plug, a second expansible plug having two relatively movable parts mounted on the sleeve with the lower part screwthreaded thereon and the other part slidable thereon, an adjusting member threaded on the sleeve above the said upper part, a handle threaded on the said rod and bearing against the upper end of the said sleeve, and a handle for rotating the said rod.

In testimony whereof I have hereunto set my hand in the presence of the two subscribed witnesses.

JACOB LEISINGER.

Witnesses:
CHAS. H. AUSTIN,
HARVEY L. LECHNER.